Dec. 30, 1924.

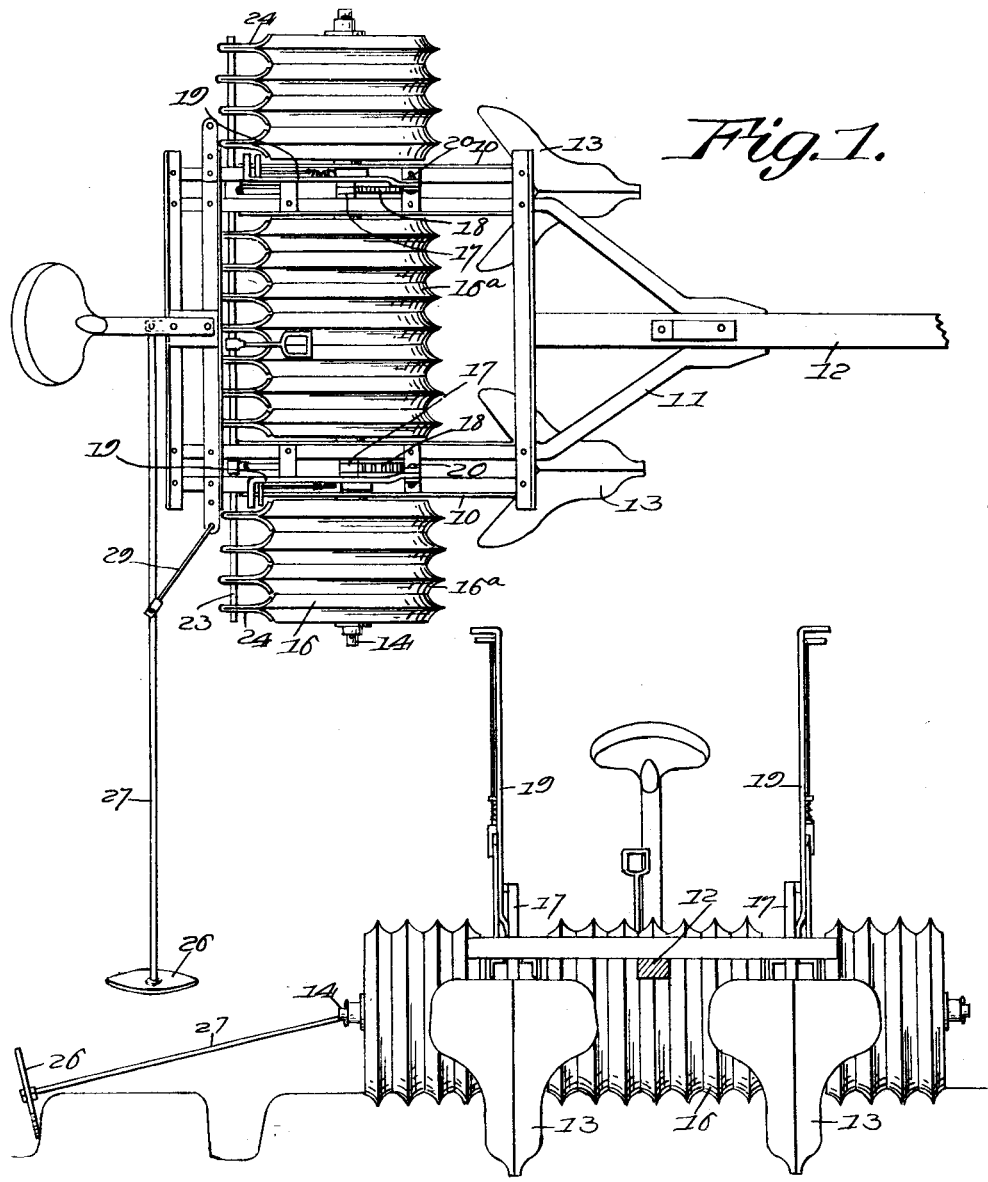

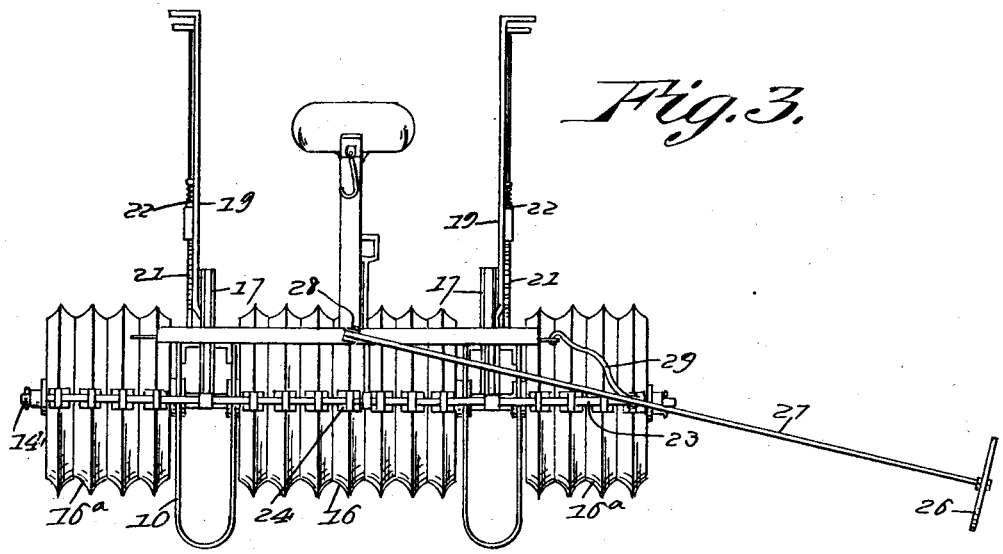
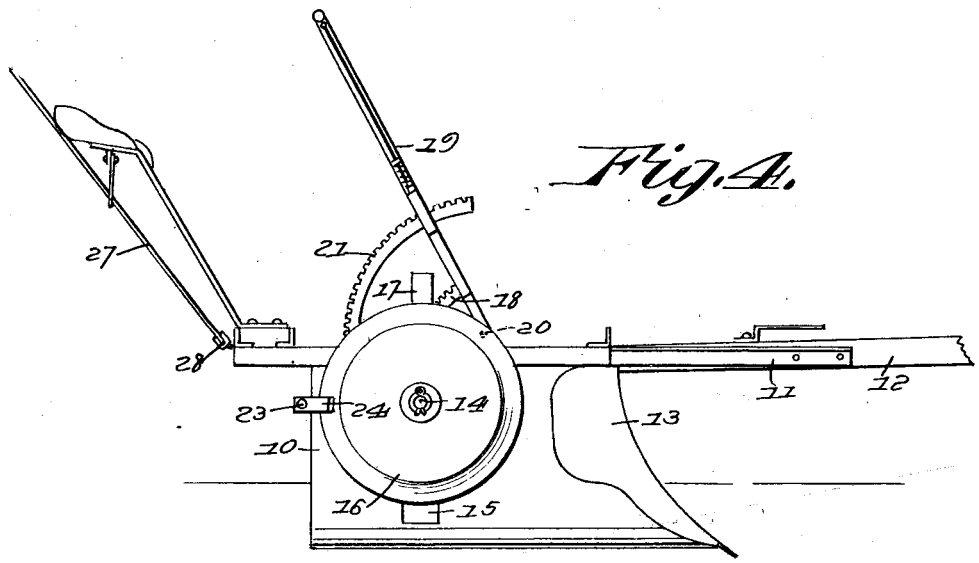

H. SCHICK

AGRICULTURAL IMPLEMENT

Filed July 27, 1920

Inventor
Henry Schick

Patented Dec. 30, 1924.

1,521,395

UNITED STATES PATENT OFFICE.

HENRY SCHICK, OF BUHL, IDAHO.

AGRICULTURAL IMPLEMENT.

Application filed July 27, 1920. Serial No. 399,262.

*To all whom it may concern:*

Be it known that I, HENRY SCHICK, a citizen of the United States, residing at Buhl, in the county of Twin Falls and State of Idaho, have invented new and useful Improvements in Agricultural Implements, of which the following is a specification.

The object of the invention is to provide a combined roller and corrugator, adapted for cutting furrows or ditches of a suitable depth for irrigation purposes and simultaneously pulverizing and rolling the surface of the soil between the furrows or corrugations; and particularly to provide a machine for this purpose wherein the turning and reversing or backing of the same may be effected with facility; and with these objects in view the invention consists in a construction and combination of parts of which a preferred embodiment is shown in the accompanying drawings wherein:

Figure 1 is a plan view of the apparatus.

Figures 2 and 3 are respectively front and rear views thereof.

Figure 4 is a side view showing the apparatus in its operative position.

Figure 5:
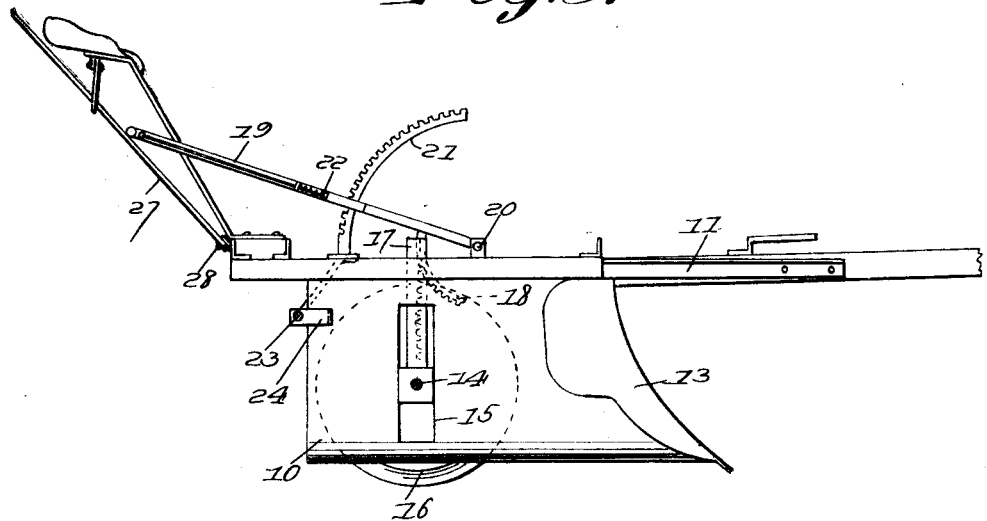
Figure 5 is a similar view partly in section showing the parts of the plows elevated to permit of turning or backing.
Figure 6:
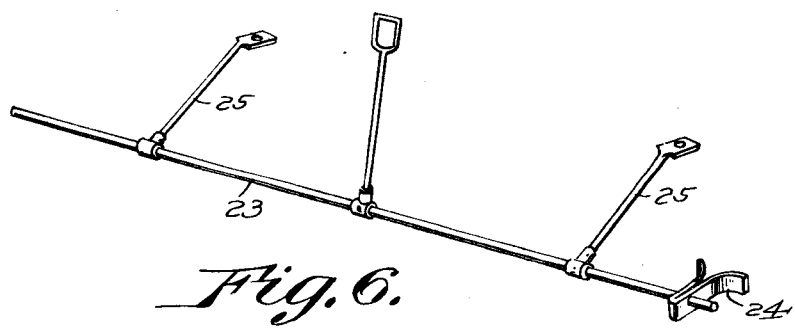
Figure 6 is a detail perspective view showing the scraper bar and its attendant supports.

The machine consists essentially of a frame having side plates 10 connected by hounds 11 to which is attached the tongue 12 or equivalent draft means, the furrowing or ditching plows 13 being carried by said side plates which constitute standards; a transverse roller shaft 14 extending through substantially vertical slots 15 in the side plates and carrying the pulverizing roller 16 consisting of a plurality of independent peripherally V-shaped sections 16ª, and means for varying the relative positions of said roller shaft and frame whereby the plows may be adjusted vertically to vary the depth of the furrows to be formed thereby. The shaft 14 carries upwardly extending rack bars 17 with which engage segmental gears 18 carried by operating handles or levers 19 pivoted as at 20 upon the frame, and said levers further traverse toothed segments 21 and carry dogs 22 for locking the levers in their adjusted positions, so that the drum shaft may be held in any desired relation vertically with reference to the frame to insure the progress of the plow shovels to the preferred and a uniform depth. The shovels are of the double form adapted to throw the earth evenly in opposite directions, and the area of the roller in rear thereof serves to roll and preferably groove the surface in accordance with the approved method of surfacing when effective irrigation is desired.

Located transversely in rear of and parallel with the roller is a scraper bar 23 provided with looped scraper blades 24 operating in the grooves between the adjacent members or elements of the roller, said bar being supported by the frame and being held in its proper relation to the roller by brackets 25.

In operation it will be seen that by releasing the levers 19 the plows may be lowered to the desired depth to provide the furrows or corrugations during the forward progress of the machine, and when it is necessary to turn or back the latter it is only necessary to depress the roller shaft relative to the frame or in other words to raise the frame relative to the shaft by depressing the free ends of the levers, in order to raise the plows sufficiently to clear the surface of the soil, the machine then being supported solely by the roller.

In connection with the apparatus it is preferred to employ a marker 26 consisting of a disk supported by a staff 27 fulcrumed as at 28 upon the frame, for example at or above the center of the width thereof, a suitable swinging retainer 29 being connected with an intermediate portion of the staff to hold it in the laterally extended position necessary to follow the furrows or corrugations previously made by the plows so that the machine may successively follow parallel paths in the systematic and uniform laying out of the furrows or corrugations.

The side plates 10, it will be noted, are of duplex form, being arched at the bottom so that the two walls thus provided stand spaced from each other thereby forming housings for the rack bars 17 and operating means therefor.

In connection with the scraper, it will be noted that the scraper elements 24 are rigidly secured to the shaft 23 and that the latter is rotatably and angularly movable in its brackets 25, the angular movement being imparted to the bar by means of a handle 30 disposed in a position convenient for operation by the occupant of the seat mounted on the frame. Moving the handle 30 forwardly will rock the bar 23 and thus cause the scraper elements 24 to be thrown down in operative position against the rollers, the reverse movement of the handle elevating the scraper elements out of engagement with the rollers.

What is claimed is:

1. A machine for the purpose indicated having a frame and draft means for the same, duplex side plates depending from the frame and arched at their lower ends to provide spaced side walls, a roller, a shaft on which the roller is mounted, the said shaft being provided with bearings fitted in vertical guides formed in the side plates, and means for adjusting the bearings in said guides for the purpose specified.

2. A machine for the purpose indicated having a frame and draft means for the same, duplex side plates depending from the frame and arched at their lower ends to provide spaced side walls, a roller, a shaft on which the roller is mounted, the said shaft being provided with bearings fitted in vertical guides formed in said side plates, rack bars upstanding from said bearings, segments meshing with the rack bars, and pivotally mounted operating levers supporting the segments, said segments and rack bars being disposed between the walls of the duplex side plates.

In testimony whereof he affixes his signature.

HENRY SCHICK.